A. W. PRATHER.
STOCK-FEEDER.

No. 192,876. Patented July 10, 1877.

WITNESSES:
Francis McArdle,
J. H. Scarborough.

INVENTOR:
A. W. Prather.
BY 
ATTORNEYS.

UNITED STATES PATENT OFFICE.

AMOS W. PRATHER, OF LINEVILLE, IOWA.

IMPROVEMENT IN STOCK-FEEDERS.

Specification forming part of Letters Patent No. 192,876, dated July 10, 1877; application filed May 28, 1877.

*To all whom it may concern:*

Figure 1:
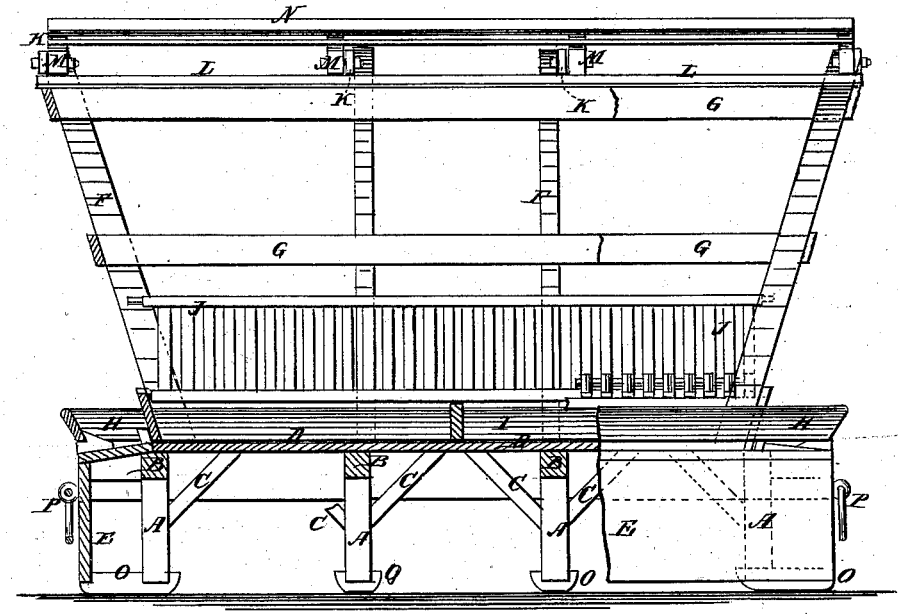
Figure 2:
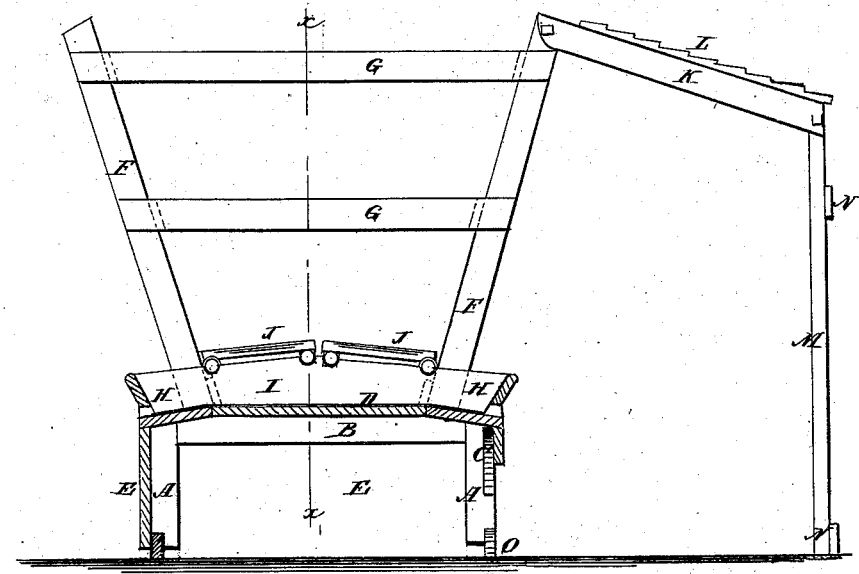
Figure 2:

Be it known that I, AMOS WALTER PRATHER, of Lineville, in the county of Wayne and State of Iowa, have invented a new and useful Improvement in Combined Stock-Feeder, Stock-Shelter, and Seed-Saver, of which the following is a specification:

Figure 1 is a side view of my improved device, partly in section, through the line $x$ $x$, Fig. 2, to show the construction. Fig. 2 is an end view of the same, partly in section, to show the construction.

Similar letters of reference indicate corresponding parts.

The object of this invention is to furnish an improved device for farmers' use for feeding and sheltering horses, cattle, mules, hogs, &c., and which shall be so constructed as to save the grain and grass seed from the grain, straw, or hay fed to the stock, and which shall be simple in construction, inexpensive in manufacture, convenient in use, and economical, as it prevents the stock from wasting the feed.

The invention consists in the combination of the seed-saver with the base and the rack, and in the combination of the shelter with the base and the rack, as hereinafter fully described.

The base of the device is formed of posts A, connected by cross-bars B, strengthened by braces C, and covered with a close floor, D. The base is inclosed upon its ends and upon one side, and partly upon the other, if desired, by a casing, E.

The posts A are made of such a length that hogs can readily pass beneath the floor D, adapting the said base to serve as a hog-shelter.

The rack to receive the hay or straw is formed of outwardly-inclined posts F, connected by horizontal bars G.

The lower part of the rack F G rests upon the floor D, and is made so much smaller than said floor as to leave a portion of floor all around it of sufficient width to serve as the bottom of a trough, H, for feeding grain, salt, &c., to the stock.

The part of the floor D that forms the bottom of the trough H is slightly inclined outward, so that any rain that may fall upon it will run off.

The outer side of the trough H is formed of narrow boards attached to blocks or cleats, so that sufficient space will be left beneath their lower edges for the water to flow out.

To the lower part of the rack F G are attached narrow boards I, the lower edges of which fit closely upon the floor D.

Upon the notched upper edges of the end boards I rest the ends of the longitudinal bars of the racks or gratings J, the middle parts of which are supported by blocks or cleats attached to the floor D.

The hay or straw is placed upon the gratings J, and the said gratings and the boards I form the seed-saver.

The outer longitudinal bars of the gratings J are pivoted so that the said gratings can be turned up against the sides of the rack F G, as shown in Fig. 1, to allow the seed to be conveniently shoveled out.

To the upper ends of the posts of the rack F G are pivoted the ends of bars or rafters K, to which are attached boards L, or boards and shingles, to form a roof to cover and shelter the stock.

To the outer ends of the bars or rafters K are pivoted the upper ends of posts M, which rest upon the ground and support the outer part of the roof K L. The posts M are connected by bars N attached to them. The bars K and M are pivoted by bolts so that they can be detached when desired.

To the lower ends of the posts A are attached shoes O, and to the ends of the device are attached draft-rings or hooks P, so that it can be conveniently drawn from place to place.

When the device is to be moved the posts M N and roof K L may be detached or may be turned up upon the top of the rack F G, as shown in Fig. 1.

Having thus described my invention, I claim as new and desire to secure by Letters Patent—

1. The combination, with the base or framework A B D I and the rack F G, of the pivoted rack or racks J, substantially as herein shown and described.

2. The combination of the shelter K L M with the rack F G, and base or frame work A B D, substantially as herein shown and described.

3. The herein-described improved portable stock feeder, shelter, and seed-saver, consisting of the hinged or pivoted frame K L M, rack F G, racks J, troughs H, base or frame work A B D E, and runners O, the several parts constructed and arranged as specified.

AMOS WALTER PRATHER.

Witnesses:
D. A. J. SARGENT,
DAVE COMSTOCK.